United States Patent
Takano et al.

(10) Patent No.: US 10,630,126 B2
(45) Date of Patent: Apr. 21, 2020

(54) ROTOR AND ROTARY ELECTRICAL MACHINE

(71) Applicant: FANUC CORPORATION, Yamanashi (JP)

(72) Inventors: Shinobu Takano, Yamanashi (JP); Takafumi Kajiya, Yamanashi (JP); Kenji Kawai, Yamanashi (JP); Hisashi Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/207,100

(22) Filed: Dec. 1, 2018

(65) Prior Publication Data

US 2019/0181707 A1    Jun. 13, 2019

(30) Foreign Application Priority Data

Dec. 11, 2017 (JP) .................... 2017-237210

(51) Int. Cl.
*H02K 1/28* (2006.01)
*H02K 1/27* (2006.01)
(Continued)

(52) U.S. Cl.
CPC .............. *H02K 1/30* (2013.01); *H02K 1/20* (2013.01); *H02K 1/278* (2013.01); *H02K 1/28* (2013.01);
(Continued)

(58) Field of Classification Search
CPC .. H02K 1/28; H02K 1/30; H02K 1/27–1/2793
(Continued)

(56) References Cited

U.S. PATENT DOCUMENTS

| | | | |
|---|---|---|---|
| 5,457,870 A * | 10/1995 | Canders | H02K 1/278 |
| | | | 156/294 |
| 2013/0342066 A1* | 12/2013 | Taniguchi | H02K 1/28 |
| | | | 310/156.28 |
| 2017/0373548 A1* | 12/2017 | Arimatsu | H02K 1/27 |

FOREIGN PATENT DOCUMENTS

| | | |
|---|---|---|
| CN | 203896069 U | 10/2014 |
| JP | 2000-023399 A | 1/2000 |

(Continued)

OTHER PUBLICATIONS

An Office Action mailed by the State Intellectual Property Office of the People's Republic of China dated Jan. 14, 2020, which corresponds to Chinese Patent Application No. 201811496504.1 and is related to U.S. Appl. No. 16/207,100; with English language translation.

*Primary Examiner* — Thomas Truong
(74) *Attorney, Agent, or Firm* — Studebaker & Brackett PC

(57) ABSTRACT

A rotor is configured such that the rotor includes: a rotary tube whose inner circumferential surface is tapered and which is fitted to a rotary shaft whose outer circumferential surface is tapered; a permanent magnet which is arranged on the outer circumferential side of the rotary tube; and a sheath tube which is fitted to the outer circumferential side of the permanent magnet so as to cover the permanent magnet, and that as the outside diameter of a multilayer member formed with the rotary tube and the permanent magnet is reduced so as to be tapered along an axial direction, the interference of the sheath tube for the multilayer member is increased so as to be tapered along the axial direction.

5 Claims, 6 Drawing Sheets

(51) Int. Cl.
*H02K 1/30* (2006.01)
*H02K 7/08* (2006.01)
*H02K 1/20* (2006.01)

(52) U.S. Cl.
CPC ......... *H02K 7/083* (2013.01); *H02K 2213/03* (2013.01)

(58) Field of Classification Search
USPC .......................... 310/156.01, 156.12, 156.31
See application file for complete search history.

(56) References Cited

FOREIGN PATENT DOCUMENTS

| | | |
|---|---|---|
| JP | 2014-212680 A | 11/2014 |
| JP | 2016-082773 A | 5/2016 |

\* cited by examiner

ROTOR AND ROTARY ELECTRICAL MACHINE

This application is based on and claims the benefit of priority from Japanese Patent Application No. 2017-237210, filed on 11 Dec. 2017, the content of which is incorporated herein by reference.

BACKGROUND OF THE INVENTION

Field of the Invention

The present invention relates to a rotor and a rotary electrical machine including such a rotor.

Related Art

As one type of motor using a permanent magnet as a rotor, a motor is known in which a permanent magnet is arranged on the outer circumferential side of a sleeve. In this type of motor, in order to reduce the dropping off of the permanent magnet from the rotor by centrifugal force at the time of high-speed rotation, a cylindrical sheath tube is fitted to the outer circumferential side of the rotor. As the material of the sheath tube, in particular, a carbon fiber-reinforced plastic (hereinafter also referred to as a "CFRP") is widely used, because it has high strength and light weight.

As a structure for fixing a rotor to a rotary shaft, a structure is known in which the outer circumferential surface of the rotary shaft and the inner circumferential surface of the rotor are individually tapered. In this structure, when the rotor is press-fitted to the rotary shaft, the inner circumferential surface of the rotor is pushed by the outer circumferential surface of the rotary shaft so as to be extended outward, and thus the rotor is fixed to the rotary shaft (see, for example, patent documents 1 to 3).

Patent Document 1: Japanese Unexamined Patent Application, Publication No. 2000-23399
Patent Document 2: Japanese Unexamined Patent Application, Publication No. 2014-212680
Patent Document 3: Japanese Unexamined Patent Application, Publication No. 2016-82773

SUMMARY OF THE INVENTION

In the structure described above, the rotary shaft includes the tapered outer circumferential surface whose outside diameter is gradually increased as the outer circumferential surface is extended from one end side to the other end side in an axial direction. When the rotary shaft has a cylindrical hollow structure, the thickness is increased in a part where the outside diameter is increased and is decreased in a part where the outside diameter is decreased. On the other hand, the rotor includes the tapered inner circumferential surface in which as the inner circumferential surface is extended from the one end side to the other end side in the axial direction, the inside diameter of a sleeve is gradually increased. Hence, in the sleeve, the thickness is decreased in a part where the inside diameter is increased and is increased in a part where the inside diameter is decreased.

As described above, the rotary shaft and the sleeve of the rotor differ from each other in the distribution of the thickness along the axial direction. Hence, the amount of outward extension of the inside diameter of the rotor when the rotor is fitted to the rotary shaft differs in the axial direction. Specifically, in the rotor, the amount of outward extension of the inside diameter of a part that is fitted to a side on which the outside diameter of the rotary shaft is increased is increased as compared with the other parts. Moreover, in the rotor, the amount of outward extension of the inside diameter of a part that is fitted to a side on which the outside diameter of the rotary shaft is decreased is decreased as compared with the other parts. This is because since in the part on which the outside diameter of the rotary shaft is decreased, the thickness is decreased, the amount of contraction when the rotor is press-fitted is increased. As described above, the amount of outward extension of the inside diameter of the rotor that is fitted to the rotary shaft differs along the axial direction. Hence, the interference of a sheath tube which is fitted to the outer circumferential side of the rotor is nonuniform along the axial direction.

An object of the present invention is to provide a rotor and a rotary electrical machine which can make the interference of a sheath tube more uniform along an axial direction.

(1) The present invention relates to a rotor (for example, a rotor 30 which will be described later) that includes: a rotary tube (for example, a sleeve 31 which will be described later) whose inner circumferential surface is tapered and which is fitted to a rotary shaft (for example, a rotary shaft 35 which will be described later) whose outer circumferential surface is tapered; a permanent magnet (for example, a permanent magnet 32 which will be described later) which is arranged on the outer circumferential side of the rotary tube; and a sheath tube (for example, a sheath tube 33 which will be described later) which is fitted to the outer circumferential side of the permanent magnet so as to cover the permanent magnet, that as the outside diameter of a multilayer member (for example, a multilayer member S which will be described later) formed with the rotary tube and the permanent magnet is reduced so as to be tapered along an axial direction (for example, an axial direction X which will be described later), the interference of the sheath tube for the multilayer member is increased so as to be tapered along the axial direction.

(2) Preferably, in the rotor of (1), the sheath tube is formed such that as the outside diameter of the multilayer member is reduced so as to be tapered along the axial direction, the inside diameter of the sheath tube is decreased so as to be tapered along the axial direction.

(3) Preferably, in the rotor of (1), the sheath tube is formed such that as the outside diameter of the multilayer member is reduced so as to be tapered along the axial direction, the thickness of the sheath tube is increased so as to be inversely tapered along the axial direction.

(4) Preferably, in the rotor of (1), the sheath tube is formed such that as the outside diameter of the multilayer member is reduced so as to be tapered along the axial direction, the inside diameter of the sheath tube is decreased so as to be tapered along the axial direction and that as the outside diameter of the multilayer member is increased so as to be inversely tapered along the axial direction, the thickness of the sheath tube is increased so as to be inversely tapered along the axial direction.

(5) The present invention relates to a rotary electrical machine (for example, a motor 1 which will be described later) which includes the rotor of any one of (1) to (4) and a stator (for example, a stator 20 which will be described later) which is provided on the outer circumferential side of the rotor.

According to the present invention, it is possible to provide a rotor and a rotary electrical machine which can make the interference of a sheath tube more uniform along an axial direction.

DETAILED DESCRIPTION OF THE INVENTION

Figure 1:
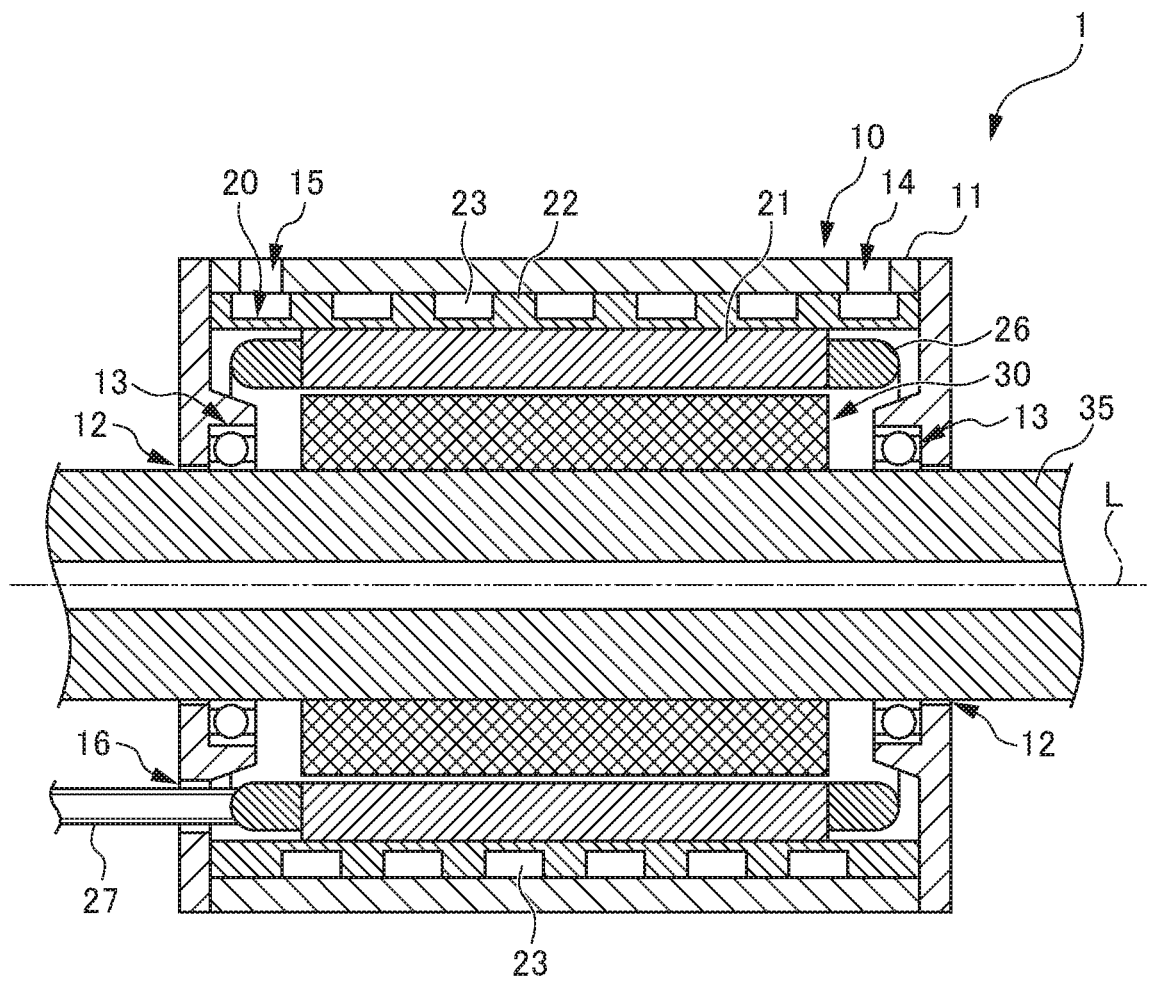
FIG. 1 is a cross-sectional view showing the configuration of a motor 1 in a first present embodiment.

Embodiments of the present invention will be described below. Drawings attached to the present specification are all schematic views, and with consideration given to ease of understanding and the like, the shapes, the scales, the vertical and horizontal dimensional ratios and the like of individual portions are changed or exaggerated from the real things. For example, in drawings which will be described later and which illustrates the configuration of a rotor, the length of a sheath tube in an axial direction and the length in a radial direction are exaggerated so as to be shorter, the thickness of the sheath tube is exaggerated and the overall shape of a permanent magnet is simplified. In the drawings, hatching which indicates the cross sections of members (for example, a permanent magnet 32) will be omitted as necessary.

In the present specification and the like, terms which specify shapes, geometric conditions and the extents thereof, for example, terms such as "directions" include not only the strict meanings of the terms but also the range of the extent to which they are regarded as being substantially the same directions. In the present specification and the like, with reference to the position of a rotor 30 shown in FIG. 1, a description will be given with the assumption that a left/right direction is an X direction. In the X direction, it is assumed that the right side is X1 and that the left side is X2. Since the X direction coincides with the "axial direction" which will be described later, for example, a description may be given in a form of, for example, "from the X2 side toward the X1 side along the axial direction X".

In the present specification and the like, a line serving as the rotation center of a rotary shaft 35 which will be described later is referred to as a "rotary shaft line L", and a direction along the rotary shaft line L is also referred to as the "axial direction X". These designations are also applied to forms in which the members of the rotor 30 such as a sleeve 31, a sheath tube 33, a multilayer member S and the like are singly present.

First Embodiment

A motor 1 serving as a rotary electrical machine which includes a rotor 30 of a first embodiment will first be described. The configuration of the motor 1 is the same as in the other embodiments which will be described later. FIG. 1 is a cross-sectional view showing the configuration of the motor 1 in the first present embodiment. The configuration of the motor 1 shown in FIG. 1 is an example, and as long as the rotor 30 of the first embodiment can be applied, the configuration is not limited.

As shown in FIG. 1, the motor 1 includes, as main configuration requirements, a frame 10, a stator 20, the rotor 30, a rotary shaft 35 and bearings 13. In the motor 1 of the present embodiment, although the inner circumferential surface of the rotor 30 and the outer circumferential surface of the rotary shaft 35 each are formed so as to be tapered as shown in drawings which will be described later, in FIG. 1, for ease of description, they are drawn in the shape of a general cylinder.

The frame 10 is an exterior member of the motor 1, and includes a frame main body 11 and a shaft hole 12. The frame main body 11 is an enclosure which surrounds and holds the stator 20. The frame main body 11 holds the rotor 30 through the bearings 13. The frame main body 11 includes a supply port 14, a discharge port 15 and a hole portion 16. The supply port 14 is an opening for supplying a coolant to a flow path 23 in a stator frame 22 and is connected to a supply pipe (unillustrated) for the coolant. The discharge port 15 is an opening for discharging the coolant circulated along the flow path 23, and is connected to a discharge pipe (unillustrated) for the coolant. The hole portion 16 is an opening through which a power line 27 drawn from the stator 20 is passed.

The shaft hole 12 is a hole through which the rotary shaft 35 (which will be described later) is passed. The stator 20 is a composite member which forms a rotary magnetic field for rotating the rotor 30. The stator 20 is formed in the shape of a cylinder as a whole, and is fixed within the frame 10. The stator 20 includes an iron core 21 and the stator frame 22.

The iron core 21 is a member inside which a winding 26 can be arranged. The iron core 21 is formed in the shape of a cylinder and is arranged inside the stator frame 22. In the inside surface of the iron core 21, a plurality of grooves (unillustrated) are formed, and the winding 26 is arranged in the grooves. Parts of the winding 26 are protruded from both end portions of the iron core 21 in the axial direction of the iron core 21. For example, the iron core 21 is produced by stacking a plurality of thin plates such as electromagnetic steel plates and integrating them such as by adhesion or crimping.

The stator frame 22 is a member which holds the iron core 21 thereinside. The stator frame 22 is formed in the shape of a cylinder, and is arranged outside the stator 20. The iron core 21 is securely joined to the stator frame 22 in order to receive a reaction force generated by the torque of the rotor 30. As shown in FIG. 1, the stator frame 22 of the present embodiment includes the flow path 23 for cooling heat transmitted from the iron core 21 in the outside surface. The flow path 23 is a spiral groove of one or a plurality of threads formed in the outside surface of the stator frame 22. The coolant (unillustrated) supplied from the supply port 14 of the frame main body 11 (the frame 10) is circulated within the flow path 23 spirally along the outside surface of the stator frame 22, and is thereafter discharged from the discharge port 15 of the frame main body 11 to the outside.

The power line 27 which is electrically connected to the winding 26 is drawn from the iron core 21 of the stator 20. The power line 27 is connected to a power supply device (unillustrated) which is installed outside the motor 1. When the motor 1 is operated, for example, a three-phase alternating current is supplied to the iron core 21 so as to form the rotary magnetic field for rotating the rotor 30.

The rotor 30 is a component which is rotated by magnetic interaction with the rotary magnetic field formed by the stator 20. The rotor 30 is provided on the inner circumferential side of the stator 20. The configuration of the rotor 30 will be described later.

The rotary shaft 35 is a member which supports the rotor 30. The rotary shaft 35 is inserted so as to pass through the center of the axis of the rotor 30, and is fixed to the rotor 30. A pair of bearings 13 are fitted to the rotary shaft 35 along the axial direction X. The bearings 13 are members which rotatably support the rotary shaft 35, and are provided in the frame main body 11. The rotary shaft 35 is supported by the frame main body 11 and the bearings 13 so as to be freely rotated about the rotary shaft line L. The rotary shaft 35 is also passed through the shaft hole 12 and is connected to, for example, a chuck device of a cutting tool or a power transmission mechanism, a deceleration mechanism or the like (none of which is illustrated) installed externally.

When in the motor 1 shown in FIG. 1, the three-phase alternating current is supplied to the stator 20 (the iron core 21), a rotary force is generated in the rotor 30 by magnetic interaction between the stator 20 where the rotary magnetic field is formed and the rotor 30, and the rotary force is output through the rotary shaft 35 to the outside.

Figure 2:
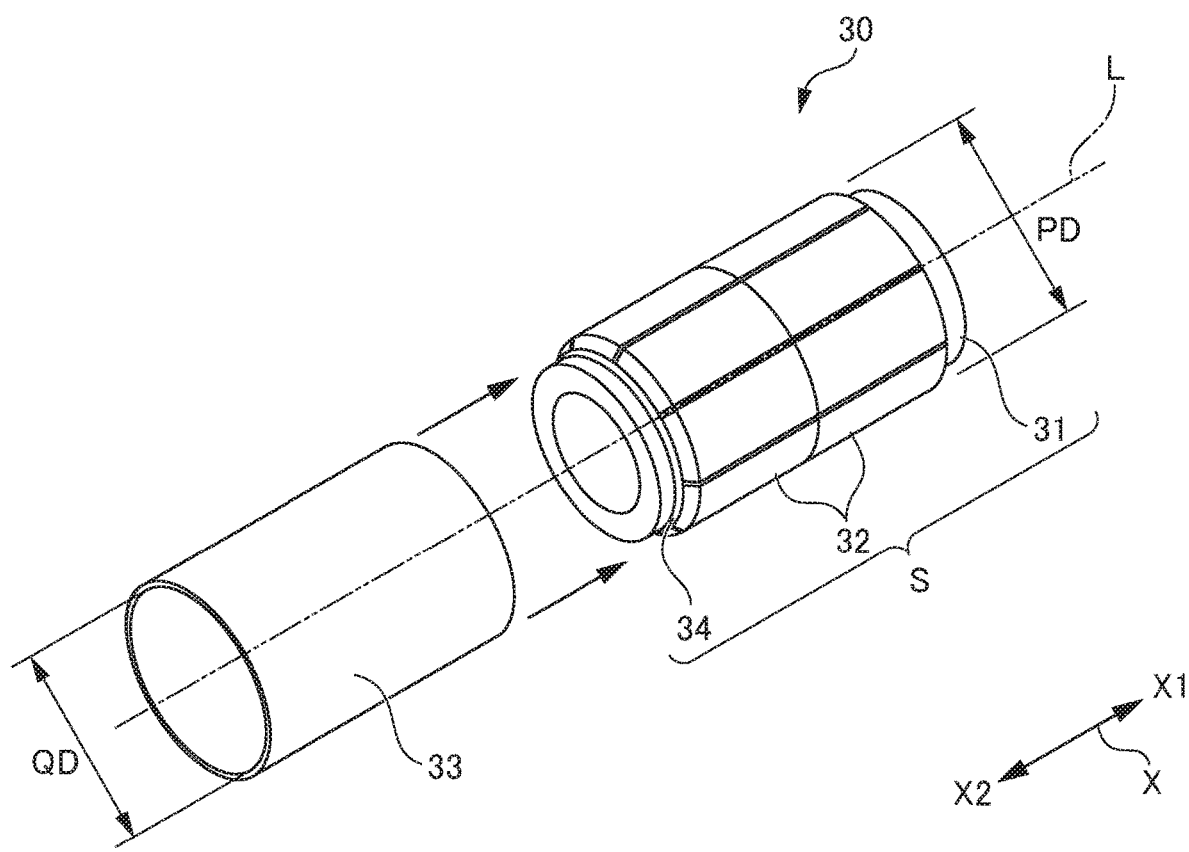
FIG. 2 is an exploded perspective view of a rotor 30.

The configuration of the rotor 30 will then be described. FIG. 2 is an exploded perspective view of the rotor 30. As shown in FIG. 2, the rotor 30 includes the sleeve (rotary tube) 31, permanent magnets 32 and the sheath tube 33. The sleeve 31 is a member to which a plurality of permanent magnets 32 are attached and which is formed substantially in the shape of a cylinder, and is provided between the rotary shaft 35 (see FIG. 1) and the permanent magnets 32. The permanent magnets 32 are arranged along the circumferential direction of the sleeve 31. The sleeve 31 is formed of, for example, a magnetic material such as carbon steel. The rotor 30 which has the sleeve 31 on the inner circumferential side is fitted to the outer circumferential side of the rotary shaft 35. In the following description, a form in which the permanent magnets 32 are provided on the outer circumferential side of the sleeve 31 is also collectively referred to as the "multilayer member S".

The permanent magnets 32 are members for generating a magnetic field, and as shown in FIG. 2, on the outer circumferential side of the sleeve 31, the permanent magnets in eight columns are provided along a circumferential direction (in FIG. 2, only the permanent magnets 32 in the four columns on the front side are shown). In the permanent magnets 32 in the eight columns, N pole permanent magnets 32 and S pole permanent magnets 32 are alternately arranged in the circumferential direction of the sleeve 31. The permanent magnets 32 are adhered through an adhesive layer 34 (which is not shown in the figures other than FIG. 2) to the outer circumferential surface of the sleeve 31. Although in the present embodiment, an example where the permanent magnet 32 in each of the columns is divided into two parts along the axial direction X of the rotor 30 is described, there is no limitation to this configuration, and the permanent magnets 32 may be divided into three or more parts along the axial direction X of the rotor 30 or may not be divided.

The sheath tube 33 is a cylindrical member for covering the permanent magnets 32. The sheath tube 33 is fitted to the outer circumferential surface of the permanent magnets 32 arranged on the sleeve 31. The sheath tube 33 is fitted to the outer circumferential surface of the permanent magnets 32, and thus it is possible to reduce the dropping off of the permanent magnets 32 from the rotor 30 by centrifugal force generated by the rotation of the rotor 30. Although in the present embodiment, as will be described later, an example where the sheath tube 33 is directly fitted to the outer circumferential surface of the permanent magnets 32 will be described, the sheath tube 33 may be fitted to the outer circumferential surface of the permanent magnets 32 through, for example, the adhesive layer.

The sheath tube 33 can be formed, for example, by wrapping a CFRP fiber sheet around a tubular fixture together with a resin. As the material of the sheath tube 33, in addition to the CFRP, for example, fiber-reinforced plastics including materials such as a glass fiber, an aramid fiber, a silicon carbide fiber, a boron fiber and a titanium alloy fiber, which have a high specific strength can be used.

The sheath tube 33 fitted to the rotor 30 is fixed to the rotor 30 by a contraction force corresponding to an interference. In this way, on the sheath tube 33, a reaction force large enough to fix the permanent magnets 32 acts against the centrifugal force generated by the rotation of the rotor 30 inward in a radial direction. As described above, in the sheath tube 33, the reaction force acts inward in the radial direction, and thus the dropping off of the permanent magnets 32 from the rotor 30 by the centrifugal force is reduced. The "inward in the radial direction" refers to a direction in which to approach the rotary shaft line L from the outside of the rotor 30.

As shown in FIG. 2, the interference refers to a dimension (PD−QD) obtained by subtracting the inside diameter QD of the sheath tube 33 before being fitted to the outer circumferential side of the permanent magnets 32 from the outside diameter PD of the permanent magnets 32 arranged on the sleeve 31. As the interference is increased, it is possible to make a larger reaction force act inward (the side of the permanent magnets 32) in the radial direction from the fitted sheath tube 33.

Figure 3A:
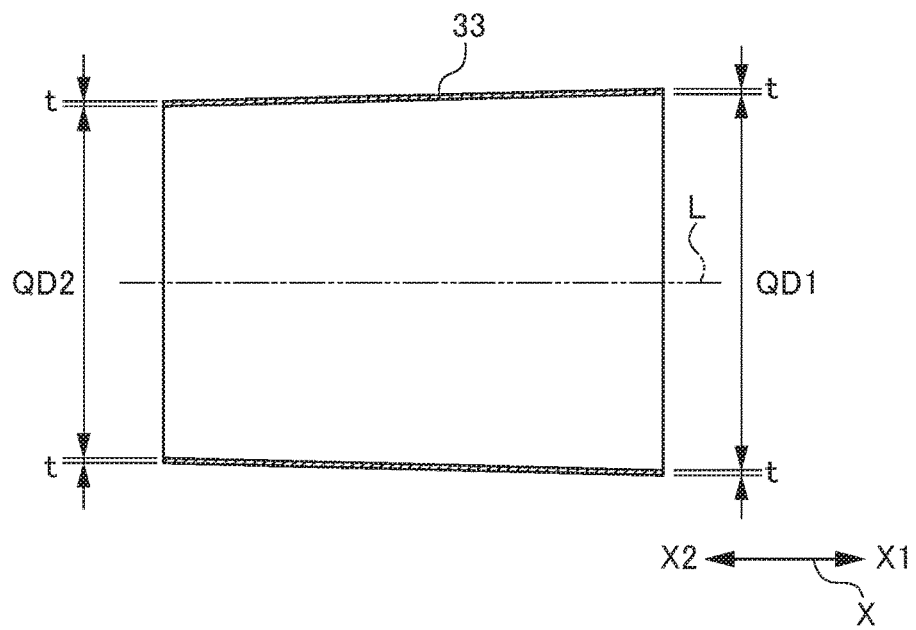
FIG. 3A is a cross-sectional view showing the shape of a sheath tube 33 in the first embodiment.
Figure 3B:
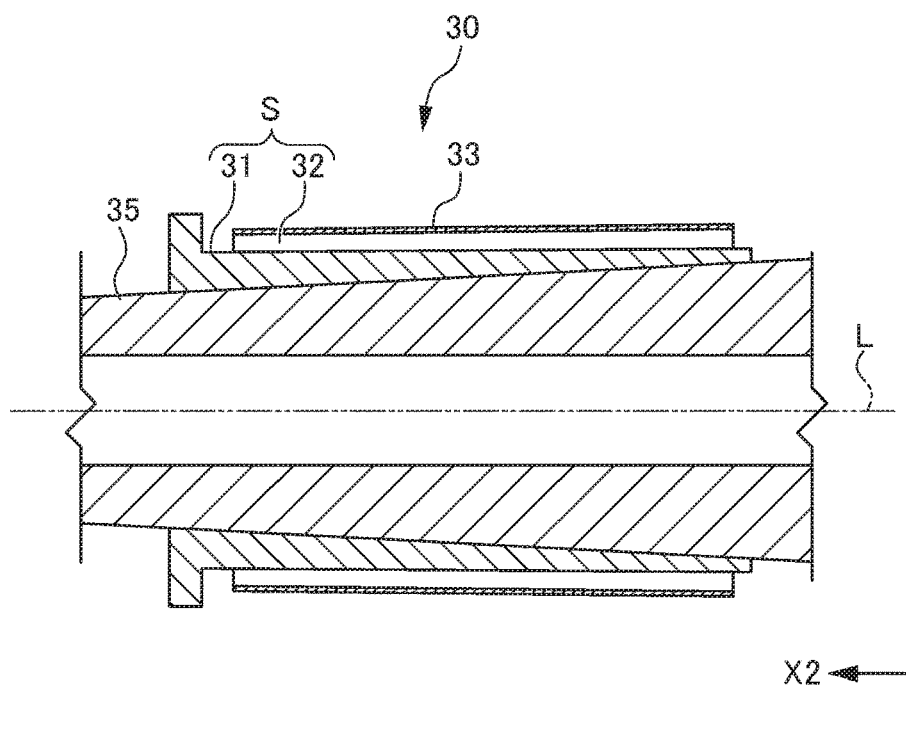
FIG. 3B is a cross-sectional view showing the configuration of a rotary shaft 35 and the rotor 30 fitted to the rotary shaft 35.

The configuration of the rotor 30 in the first embodiment will then be described. FIG. 3A is a cross-sectional view showing the shape of the sheath tube 33 in the first embodiment. FIG. 3B is a cross-sectional view showing the configuration of the rotary shaft 35 and the rotor 30 fitted to the rotary shaft 35.

As shown in FIG. 3A, in a single state, the sheath tube 33 of the first embodiment is formed so as to be uniform in the thickness t along the axial direction X. The sheath tube 33 is formed such that when the rotor 30 is fitted to the rotary shaft 35, as the outside diameter of the multilayer member S is reduced so as to be tapered from the X1 side toward the X2 side along the axial direction X, the inside diameter is decreased so as to be tapered along the axial direction X. Specifically, the sheath tube 33 is formed such that as shown in FIG. 3A, an inside diameter QD2 on the X2 side in the axial direction X is decreased so as to be tapered with respect to an inside diameter QD1 on the X1 side in the axial direction X (QD2<QD1).

As shown in FIG. 2, the sheath tube 33 is fitted to the outer circumferential side of the multilayer member S. The sheath tube 33 is fitted to the multilayer member S, and thus the rotor 30 is formed. The rotor 30 is inserted from the X2 side of the rotary shaft 35 with the X1 side serving as the larger diameter side on the front. The rotor 30 inserted on the rotary shaft 35 is press-inserted with the axial direction X of the rotary shaft 35 directed toward the X1 side, and is fixed in a predetermined position in the axial direction X1 as shown in FIG. 3B.

As described previously, the rotary shaft 35 and the sleeve 31 of the rotor 30 differ from each other in the distribution of the thickness along the axial direction X, and thus when the rotor 30 is prese-fitted to the rotary shaft 35, the amount of extension of the inside diameter of the rotor 30 differs in the axial direction X. In other words, on the X1 side on which the outside diameter of the rotary shaft 35 is increased, the amount of extension of the inside diameter of the rotor 30 is increased as compared with the X2 side on which the outside diameter of the rotary shaft 35 is decreased. Moreover, on the X2 side on which the outside diameter of the rotary shaft 35 is decreased, the amount of extension of the inside diameter of the rotor 30 is decreased as compared with the X1 side on which the outside diameter of the rotary shaft 35 is increased.

A conventional sheath tube is formed such that the thickness is uniform along the axial direction and that the inside diameter is equal along the axial direction. Hence, when the rotor 30 including the sheath tube is fitted to the rotary shaft 35, on the X1 side on which the outside diameter of the rotary shaft 35 is increased, the amount of extension of the inside diameter of the rotor 30 by the rotary shaft 35 is increased whereas on the X2 side on which the outside diameter of the rotary shaft 35 is decreased, the amount of extension thereof by the rotary shaft 35 is decreased. Consequently, the interference of the sheath tube fitted to the outer circumferential side of the rotor 30 is nonuniform along the axial direction. In other words, in the rotor 30 to which the conventional sheath tube is fitted, as compared with the X1 side on which the outside diameter of the rotary shaft 35 is increased, the interference is loosened on the X2 side on which the outside diameter of the rotary shaft 35 is decreased.

As described above, in a part of the rotor 30 in which the interference of the sheath tube is loose, the force for fixing the permanent magnets 32 is lowered. In a case where in the rotor 30, the interference of the sheath tube is nonuniform along the axial direction, when the rotor 30 is rotated at high speed, the permanent magnets 32 in the part in which the interference is loose are displaced, with the result that there is a possibility that an appropriate torque cannot be obtained. The tendency described above becomes more remarkable as the rotation speed of the rotor 30 is increased.

By contrast, the sheath tube 33 of the first embodiment is formed such that as the outside diameter of the multilayer member S is reduced so as to tapered from the X1 side toward the X2 side along the axial direction X, the inside diameter is decreased so as to be tapered along the axial direction X. In this way, although in the rotor 30 to which the sheath tube 33 is fitted, the amount of extension thereof by the rotary shaft 35 is decreased in a part that is fitted to the X2 side on which the outside diameter of the rotary shaft 35 is decreased, in this part, the interference of the sheath tube 33 is increased (the inside diameter is decreased so as to be tapered along the axial direction X), and thus the permanent magnets 32 in this part can be fixed with a sufficient reaction force.

As described above, in the rotor 30 to which the sheath tube 33 of the first embodiment is fitted, the part in which the interference of the sheath tube 33 is loose is reduced, and thus the interference of the sheath tube 33 is more uniform along the axial direction X. Hence, when the rotor 30 is rotated at high speed, the permanent magnets 32 are unlikely to be displaced. Thus, it is possible to rotate, at a higher speed, the rotor 30 to which the sheath tube 33 of the first embodiment is fitted.

It can be considered that in the conventional sheath tube, the interference is increased along the axial direction as compared with a normal case so that a part in which the interference is loose is removed. However, in the configuration described above, in a part of the rotor 30 that is fitted to the X1 side on which the outside diameter of the rotary shaft 35 is increased, the interference is excessively increased, with the result that the permanent magnets 32 in this part may be deformed. However, in the rotor 30 of the first embodiment, the interference of the sheath tube 33 is more uniform along the axial direction X, and thus a case where the interference is partially excessively increased is reduced, with the result that it is possible to reduce the deformation of the permanent magnets 32.

In the sheath tube 33 of the first embodiment, as shown in FIG. 3A, the thickness t is uniform along the axial direction X, and thus as described previously, the sheath tube 33 can easily be produced by the method of wrapping the CFRP fiber sheet around the tubular fixture together with the resin.

Second Embodiment

The rotary electrical machine 1 of a second embodiment differs from that of the first embodiment in the configuration of a sheath tube. The rotary electrical machine 1 of the second embodiment is the same as that of the first embodiment in the other configurations. Hence, in the second embodiment, only a rotor 130 and a rotary shaft 35 will be illustrated, and the entire illustration of the rotary electrical machine 1 will be omitted. In the description and drawings of the second embodiment, the same members as in the first embodiment or parts achieving similar functions are identified with the same reference numerals as in the first embodiment or by adding the same numerals to the ends (the last two digits) as necessary, and the repeated description thereof will be omitted.

Figure 4A:
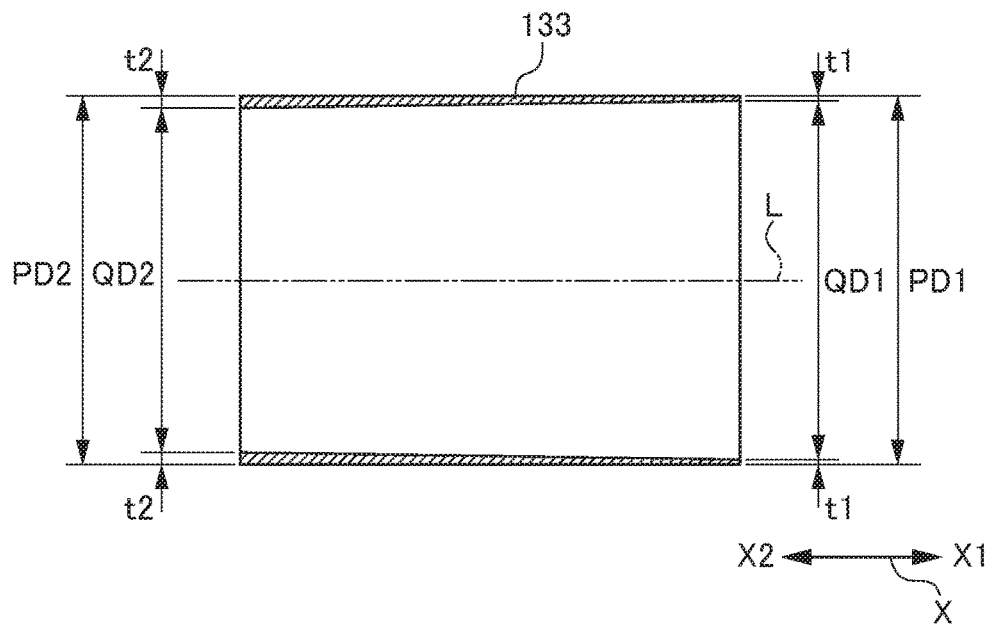
FIG. 4A is a cross-sectional view showing the shape of a sheath tube 133 in a second embodiment.
Figure 4B:
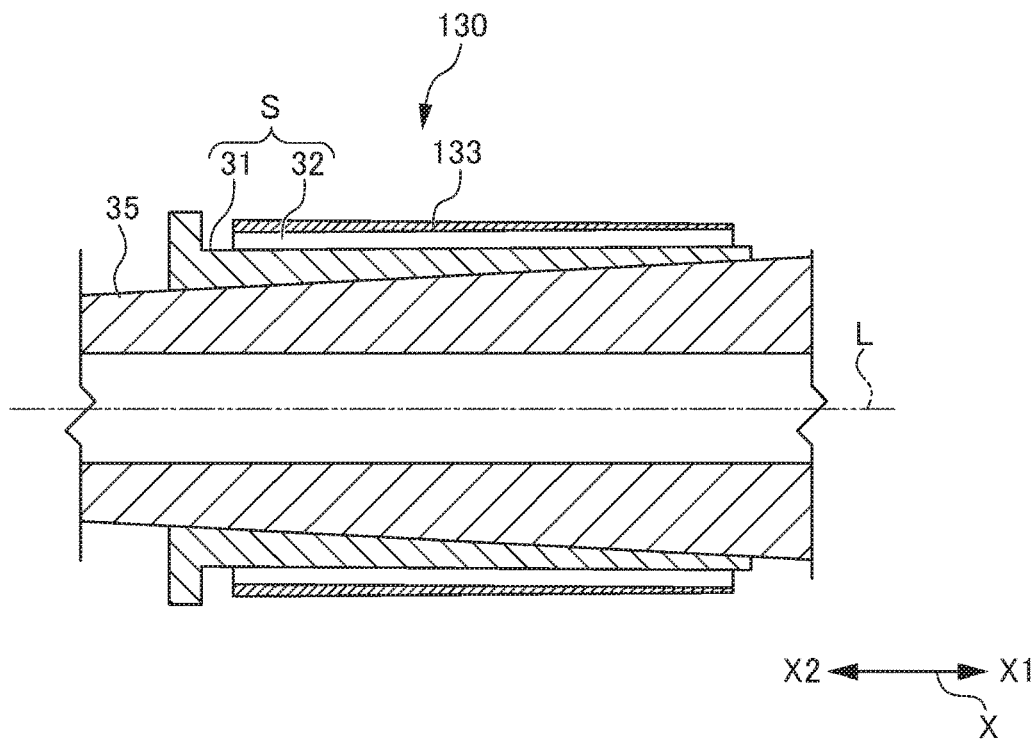
FIG. 4B is a cross-sectional view showing the configuration of a rotary shaft 35 and a rotor 130 fitted to the rotary shaft 35.

FIG. 4A is a cross-sectional view showing the shape of a sheath tube 133 in the second embodiment. FIG. 4B is a cross-sectional view showing the configuration of the rotary shaft 35 and a rotor 130 fitted to the rotary shaft 35.

As shown in FIG. 4A, the sheath tube 133 of the second embodiment is formed such that the outside diameter is equal along the axial direction X. In other words, in the sheath tube 133, an outside diameter PD1 on the X1 side in the axial direction X is equal to an outside diameter PD2 on the X2 side in the axial direction X (PD1=PD2). The sheath tube 133 is formed such that when the rotor 130 is fitted to the rotary shaft 35, as the outside diameter of the multilayer member S is reduced so as to be tapered from the X1 side toward the X2 side along the axial direction X, the thickness is increased so as to be tapered from the X1 side toward the X2 side along the axial direction X. Specifically, as shown in FIG. 4A, the sheath tube 133 is formed such that a thickness t2 on the X2 side in the axial direction X is increased so as to be inversely tapered with respect to a thickness t1 on the X1 side in the axial direction X (t2>t1). In other words, the sheath tube 133 is formed such that the inside diameter QD2 on the X2 side in the axial direction X is decreased so as to be tapered with respect to an inside diameter QD1 on the X1 side in the axial direction X (QD2<QD1).

The sheath tube 133 of the second embodiment described above is formed such that when the rotor 130 is fitted to the rotary shaft 35, as the outside diameter of the multilayer member S is reduced so as to be tapered from the X1 side toward the X2 side along the axial direction X, the thickness of the sheath tube 133 is increased so as to be inversely tapered along the axial direction X. In this way, although in the rotor 130 to which the sheath tube 133 is fitted, in a part that is fitted to the X2 side on which the outside diameter of the rotary shaft 35 is decreased, the interference of the sheath tube 133 is increased (the thickness is increased so as to be inversely tapered along the axial direction X), and thus the permanent magnets 32 in this part can be fixed with a sufficient reaction force.

As described above, in the rotor 130 to which the sheath tube 133 of the second embodiment is fitted, the part in which the interference of the sheath tube 133 is loose is reduced, and thus the interference of the sheath tube 133 is more uniform along the axial direction X, with the result that when the rotor 130 is rotated at high speed, the permanent magnets 32 are unlikely to be displaced. Thus, it is possible to rotate, at a higher speed, the rotor 130 to which the sheath tube 133 of the second embodiment is fitted. In the sheath tube 133 of the second embodiment, the interference of the sheath tube 133 is more uniform along the axial direction X and thus a case where the interference is partially excessively increased is reduced, with the result that it is possible to reduce the deformation of the permanent magnets 32.

Since in the sheath tube 133 of the second embodiment, the outside diameter is equal along the axial direction X, when the rotor 130 is fitted to the inner circumferential side of the stator 20 (see FIG. 1), the rotor 130 is easily inserted into the stator 20 straight in the axial direction X. On the other hand, in a case where the outside diameter of the rotor is tapered along the axial direction X, when the rotor is fitted to the inner circumferential side of the stator 20, the rotor is attracted to the inner circumferential side of the stator 20 by the magnetic force of the permanent magnets 32 so as to be easily inclined with respect to the axial direction X. Hence, the sheath tube fitted to the outer circumferential side of the rotor interferes with the stator 20, and thus the sheath tube is easily damaged.

However, when the rotor 130 of the second embodiment is fitted to the inner circumferential side of the stator 20, the rotor 130 is easily inserted into the stator 20 straight in the axial direction X. Thus, in the rotor 130 of the second embodiment, the sheath tube 133 fitted to the outer circumferential side is unlikely to interfere with the stator 20. Hence, in the rotor 130 of the second embodiment, when the rotor 130 is fitted to the inner circumferential side of the stator 20, it is possible to reduce the damage of the sheath tube 133.

Third Embodiment

The rotary electrical machine 1 of a third embodiment differs from that of the first embodiment in the configuration of a sheath tube. The rotary electrical machine 1 of the third embodiment is the same as that of the first embodiment in the other configurations. Hence, in the third embodiment, only a rotor 230 and a rotary shaft 35 will be illustrated, and the entire illustration of the rotary electrical machine 1 will be omitted. In the description and drawings of the third embodiment, the same members as in the first embodiment or parts achieving similar functions are identified with the same reference numerals as in the first embodiment or by adding the same numerals to the ends (the last two digits) as necessary, and the repeated description thereof will be omitted.

Figure 5A:
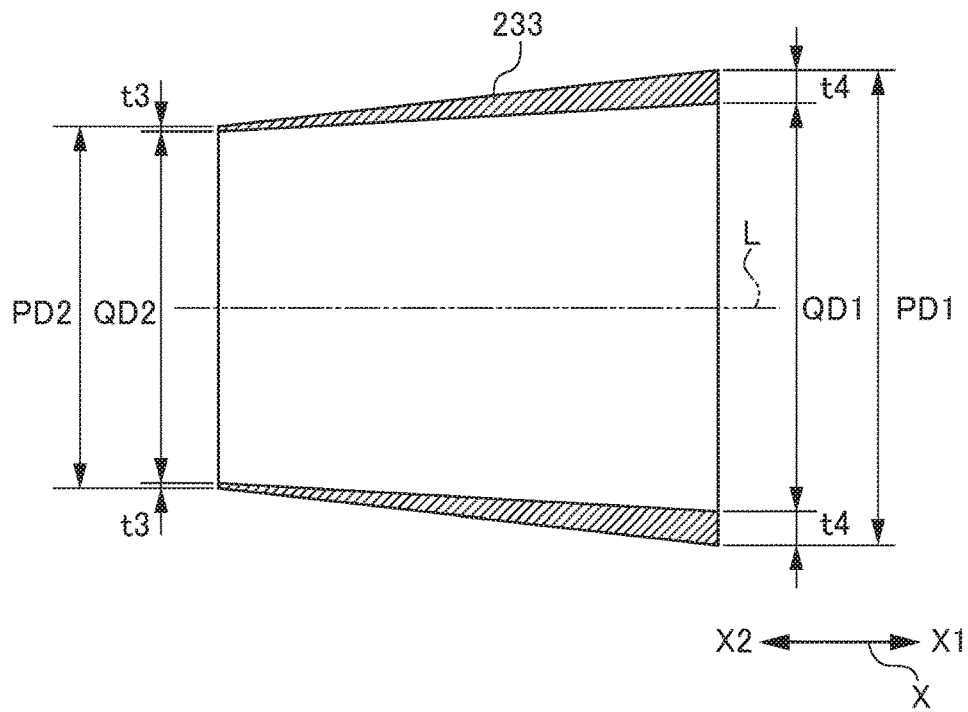
FIG. 5A is a cross-sectional view showing the shape of a sheath tube 233 in a third embodiment.
Figure 5B:
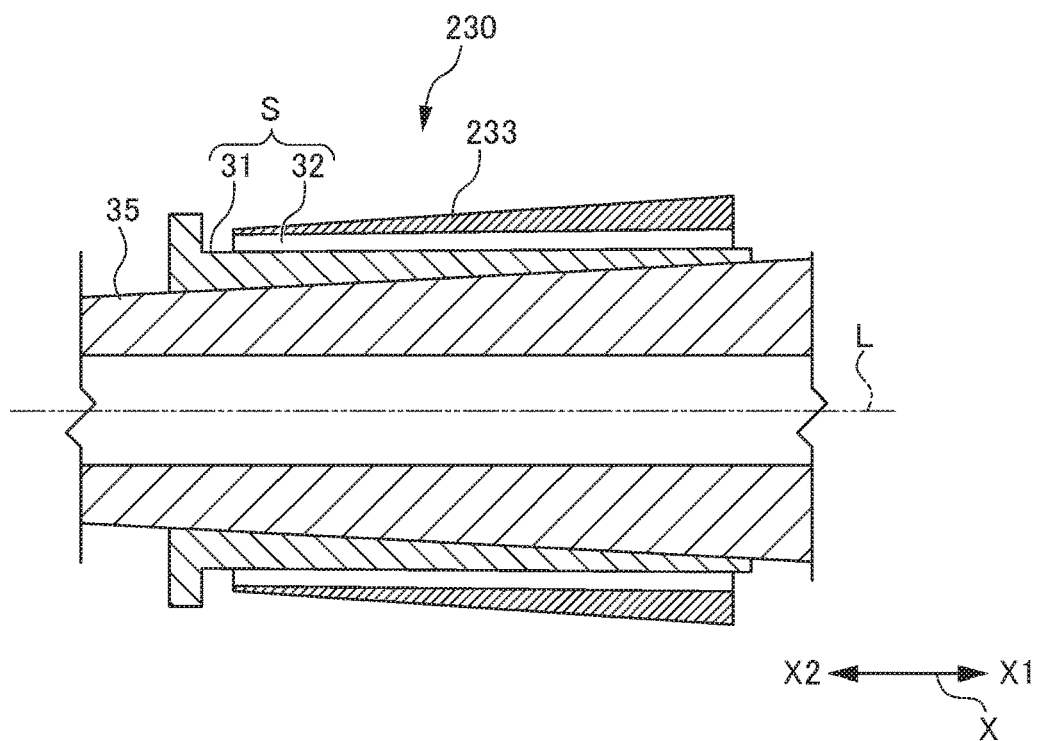
FIG. 5B is a cross-sectional view showing the configuration of a rotary shaft 35 and a rotor 230 fitted to the rotary shaft 35.

FIG. 5A is a cross-sectional view showing the shape of a sheath tube 233 in the third embodiment. FIG. 5B is a cross-sectional view showing the configuration of the rotary shaft 35 and the rotor 230 fitted to the rotary shaft 35.

The sheath tube 233 of the third embodiment is formed such that when the rotor 230 is fitted to the rotary shaft 35, as the outside diameter of the multilayer member S is reduced so as to be tapered from the X1 side toward the X2 side along the axial direction X, the inside diameter is decreased so as to be tapered along the axial direction X. Specifically, the sheath tube 233 is formed such that as shown in FIG. 5A, the inside diameter QD2 on the X2 side in the axial direction X is decreased so as to be tapered with respect to the inside diameter QD1 on the X1 side in the axial direction X (QD2<QD1).

The sheath tube 233 is formed such that when the rotor 130 is fitted to the rotary shaft 35, as the outside diameter of the multilayer member S is increased so as to be inversely tapered from the X2 side toward the X1 side along the axial direction X, the thickness is increased so as to be inversely tapered from the X2 side toward the X1 side along the axial direction X. Specifically, as shown in FIG. 5A, the sheath tube 233 is formed such that a thickness t4 on the X1 side in the axial direction X is increased so as to be inversely tapered with respect to a thickness t3 on the X2 side in the axial direction X (t4>t3). In other words, the sheath tube 233 is formed such that an outside diameter PD1 on the X1 side in the axial direction X is increased with respect to an outside diameter PD2 on the X2 side in the axial direction X (PD2<PD1).

The sheath tube 233 of the third embodiment described above is formed such that when the rotor 230 is fitted to the rotary shaft 35, as the outside diameter of the multilayer member S is reduced so as to be tapered from the X1 side toward the X2 side along the axial direction X, the inside diameter of the sheath tube 233 is decreased so as to be tapered along the axial direction X. In this way, although in the rotor 230 to which the sheath tube 233 is fitted, in a part that is fitted to the X2 side on which the outside diameter of the rotary shaft 35 is decreased, the interference of the sheath tube 33 is increased (the inside diameter is decreased so as to be tapered along the axial direction X), and thus the permanent magnets 32 in this part can be fixed with a sufficient reaction force.

As described above, in the rotor 230 to which the sheath tube 233 of the third embodiment is fitted, the part in which the interference of the sheath tube 233 is loose is reduced, and thus the interference of the sheath tube 233 is more uniform along the axial direction X, with the result that when the rotor 230 is rotated at high speed, the permanent magnets 32 are unlikely to be displaced. Thus, it is possible to rotate, at a higher speed, the rotor 230 to which the sheath tube 233 of the third embodiment is fitted. In the sheath tube 233 of the third embodiment, the interference of the sheath tube 233 is more uniform along the axial direction X, and thus a case where the interference is partially excessively increased is reduced, with the result that it is possible to reduce the deformation of the permanent magnets 32.

Furthermore, the sheath tube 233 of the third embodiment is formed such that as the outside diameter of the multilayer member S is increased so as to be inversely tapered from the X2 side toward the X1 side along the axial direction X, the thickness of the sheath tube 233 is increased so as to be inversely tapered along the axial direction X. In this way, when the rotor 230 is fitted to the rotary shaft 35, the amount of contraction of the sheath tube 233 inward in the radial direction is increased, and thus the outside diameter of the rotor 230 after the rotor 230 is fitted to the rotary shaft 35 can be made substantially uniform along the axial direction X.

Although the embodiments of the present invention are described above, the present invention is not limited to the embodiments described above, various variations and modifications are possible as in variation forms which will be described later and they are also included in the technical scope of the present invention. The effects described in the embodiments are simply a list of most preferred effects produced from the present invention, and there is no limitation to the effects described in the embodiments. Although the embodiments described above and the variation forms which will described later can also be used by being combined as necessary, the detailed description thereof will be omitted.

(Variation Forms)

Figure 6:
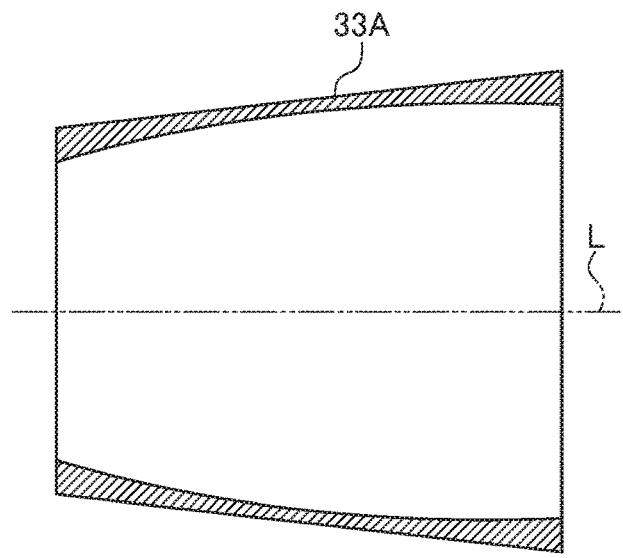
FIG. 6 is a cross-sectional view showing the shape of a sheath tube 33A in a first variation form.
Figure 6:
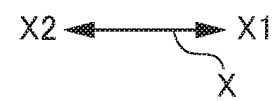
Figure 7:
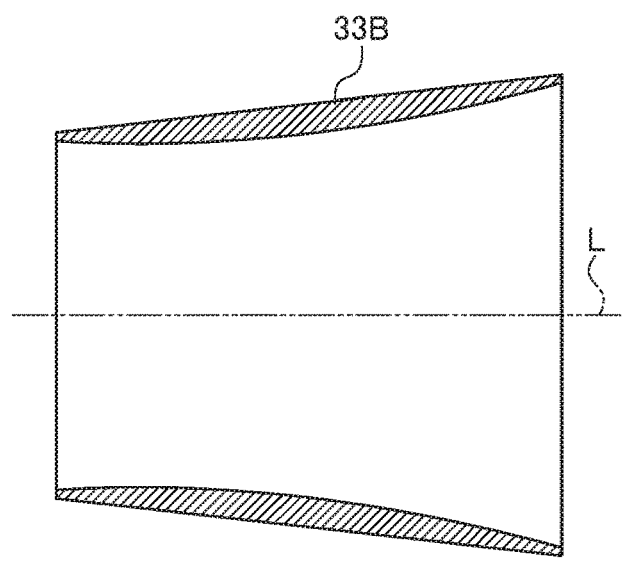
FIG. 7 is a cross-sectional view showing the shape of a sheath tube 33B in a second variation form.
Figure 7:
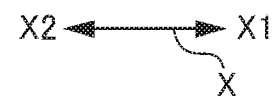

Although in the first embodiment, as shown in FIG. 3A, the example where the thickness of the sheath tube 33 is uniform along the axial direction X is described, there is no limitation to this configuration. The cross-sectional shape of the sheath tube 33 may be changed according to, for example, the outside diameter of the permanent magnets 32. FIG. 6 is a cross-sectional view showing the shape of a sheath tube 33A in a first variation form. FIG. 7 is a cross-sectional view showing the shape of a sheath tube 33B in a second variation form. In FIGS. 6 and 7, the cross-sectional shape of the sheath tube is exaggerated.

As shown in FIG. 6, the sheath tube 33A of the first variation form is formed such that the cross-sectional shape of the sheath tube 33A is the shape of a mortar along the axial direction X. Here, the mortar shape refers to a shape in which as shown in FIG. 6, in the cross-sectional shape of the side surface of the sheath tube 33A, the thickness is increased on the X2 side in the axial direction X, is gradually decreased toward the X1 side and is gradually increased from near the middle in the axial direction X toward the X1 side. In other words, the mortar shape refers to the shape in which when the sheath tube 33A is seen as a whole, the inside diameter of the sheath tube 33A is decreased on the X2 side in the axial direction X, is gradually increased toward the X1 side and is gradually decreased from near the middle in the axial direction X toward the X1 side.

In the configuration described above, when the cross-sectional shape of the permanent magnets 32 (see FIG. 2) is the shape of a drum along the axial direction X (see the cross-sectional shape of the sheath tube 33B which will be described later), a gap is unlikely to be produced between the inner circumferential surface of the sheath tube 33A fitted to the multilayer member S and the outer circumferential surface of the permanent magnets 32. As described above, in the sheath tube 33A of the first variation form, even when the cross-sectional shape of the permanent magnets 32 is the shape of a drum along the axial direction X, a gap is unlikely to be produced between the sheath tube 33A and the permanent magnets 32, and thus the interference of the multilayer member S can be made more uniform along the axial direction X.

As shown in FIG. 7, the sheath tube 33B of the second variation form is formed such that the cross-sectional shape of the sheath tube 33B is the shape of a drum along the axial direction X. Here, the drum shape refers to a shape in which as shown in FIG. 7, in the cross-sectional shape of the side surface of the sheath tube 33B, the thickness is decreased on the X2 side in the axial direction X, is gradually increased toward the X1 side and is gradually decreased from near the middle in the axial direction X toward the X1 side. In other words, the drum shape refers to the shape in which when the sheath tube 33B is seen as a whole, the inside diameter of the sheath tube 33B is increased on the X2 side in the axial direction X, is gradually decreased toward the X1 side and is gradually increased from near the middle in the axial direction X toward the X1 side.

In the configuration described above, when the cross-sectional shape of the permanent magnets 32 (see FIG. 2) is the shape of a mortar along the axial direction X (see the cross-sectional shape of the sheath tube 33A described above), a gap is unlikely to be produced between the inner circumferential surface of the sheath tube 33B fitted to the multilayer member S and the outer circumferential surface of the permanent magnets 32. As described above, in the sheath tube 33B of the second variation form, even when the cross-sectional shape of the permanent magnets 32 is the shape of a mortar along the axial direction X, a gap is unlikely to be produced between the sheath tube 33B and the permanent magnets 32, and thus the interference of the multilayer member S can be made more uniform along the axial direction X.

Although in the embodiments, the example where the sheath tube is formed of a carbon fiber-reinforced plastic (CFRP) is described, there is no limitation to this example. The sheath tube may be formed of the fiber-reinforced plastic (FRP) previously illustrated or may be formed of a composite member whose main material is the fiber-reinforced plastic. The sheath tube may be formed of not only the fiber-reinforced plastic but also, for example, a metal material such as stainless steel. Although in the embodiments, as the rotary electrical machine to which the rotor of the present invention can be applied, the motor is described as an example, there is no limitation to this example. The rotary electrical machine may be a generator.

EXPLANATION OF REFERENCE NUMERALS

1: motor, 20: stator, 30, 130, 230: rotor, 32: permanent magnet, 33, 133, 233, 33A, 33B: sheath tube, 35: rotary shaft, S: multilayer member, X: axial direction

What is claimed is:

1. A rotor comprising: a rotary tube whose inner circumferential surface is tapered and which is fitted to a rotary shaft whose outer circumferential surface is tapered;
a permanent magnet which is arranged on an outer circumferential side of the rotary tube; and
a sheath tube which is fitted to an outer circumferential side of the permanent magnet so as to cover the permanent magnet,
wherein as an outside diameter of a multilayer member formed with the rotary tube and the permanent magnet is reduced so as to be tapered along an axial direction, an interference of the sheath tube for the multilayer member is increased so as to be tapered along the axial direction.

2. The rotor according to claim 1,
wherein the sheath tube is formed such that as the outside diameter of the multilayer member is reduced so as to be tapered along the axial direction, an inside diameter of the sheath tube is decreased so as to be tapered along the axial direction.

3. The rotor according to claim 1,
wherein the sheath tube is formed such that as the outside diameter of the multilayer member is reduced so as to be tapered along the axial direction, a thickness of the sheath tube is increased so as to be inversely tapered along the axial direction.

4. The rotor according to claim 1,
wherein the sheath tube is formed such that as the outside diameter of the multilayer member is reduced so as to be tapered along the axial direction, an inside diameter of the sheath tube is decreased so as to be tapered along the axial direction and that as the outside diameter of the multilayer member is increased so as to be inversely tapered along the axial direction, a thickness of the sheath tube is increased so as to be inversely tapered along the axial direction.

5. A rotary electrical machine comprising: the rotor according to claim 1; and
a stator which is provided on an outer circumferential side of the rotor.

* * * * *